United States Patent [19]

Beck et al.

[11] 4,063,624
[45] Dec. 20, 1977

[54] HIGH-RELIABILITY AIR BRAKE SYSTEM WITH TRANSMISSION NEUTRALIZER PROVIDING A PLURALITY OF OPERATIONAL MODES

[75] Inventors: Henry E. Beck; Jimmie L. Hasten, both of Oswego; Ernest C. Sindelar, Aurora, all of Ill.

[73] Assignee: Caterpillar Tractor Co., Peoria, Ill.

[21] Appl. No.: 695,879

[22] Filed: June 14, 1976

[51] Int. Cl.$^2$ .............................................. B60K 29/00
[52] U.S. Cl. ................................. 192/4 A; 188/106 P
[58] Field of Search ................................. 192/4 A, 4 C

[56] References Cited

U.S. PATENT DOCUMENTS

| | | | |
|---|---|---|---|
| 3,050,165 | 8/1962 | Day et al. | 192/4 A X |
| 3,565,220 | 2/1971 | Lammers et al. | 192/4 A |
| 3,621,956 | 11/1971 | Suckow | 192/4 A |
| 3,999,462 | 12/1976 | Chamberlain | 192/4 A X |

Primary Examiner—Benjamin W. Wyche
Attorney, Agent, or Firm—Frank L. Hart

[57] ABSTRACT

An air brake control system of high reliability is provided for a vehicle of the type having front wheel brakes, rear wheel brakes, a first brake control element such as a pedal which actuates the front and rear brakes, and a second brake control element such as a pedal which also actuates the front and rear brakes. First and second pneumatic circuit means for controlling the brakes are duplicated back to the outlet of the air compressor in an arrangement where one side of the circuit is automatically isolated from the other to maintain braking capacity if a loss of air pressure occurs on the one side. Means is associated with air streams of only a selected one of the first and second means for providing a function absent in said first and second means. A transmission neutralizer is also operated by one of the pedals.

20 Claims, 5 Drawing Figures

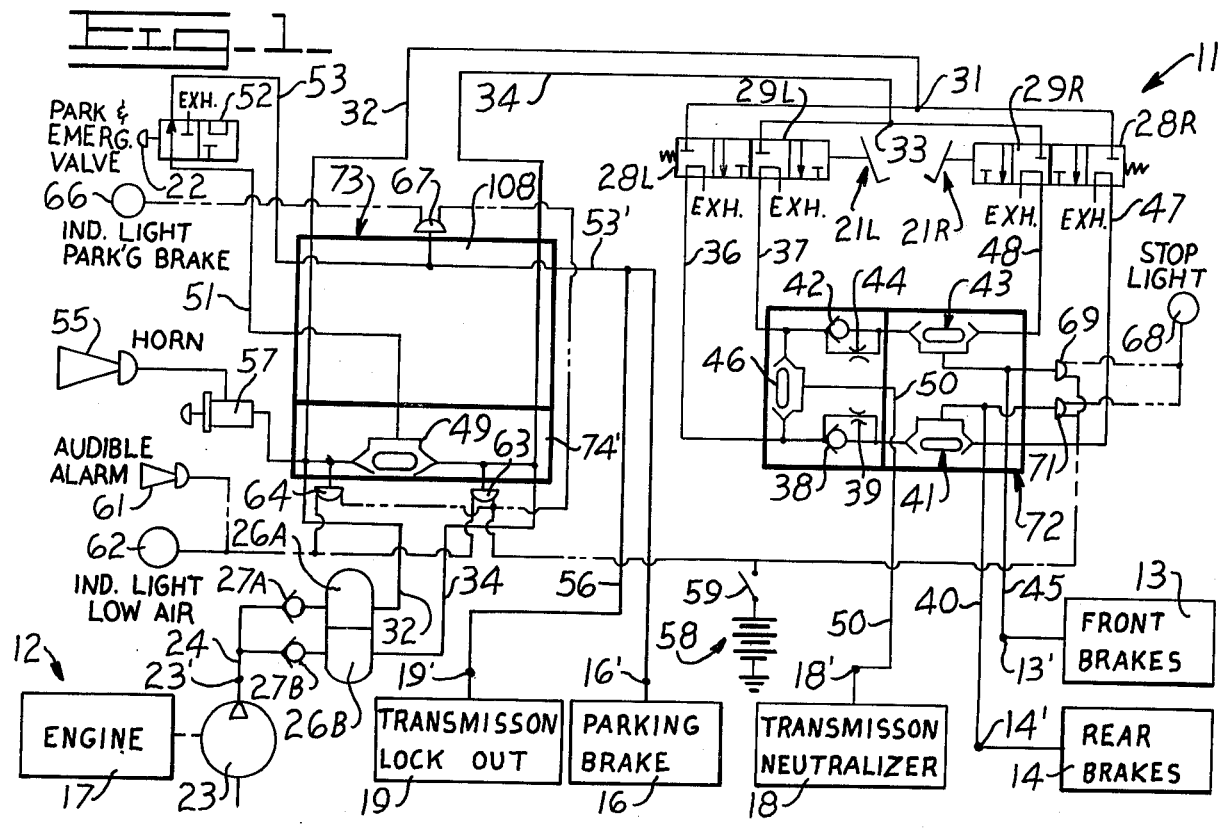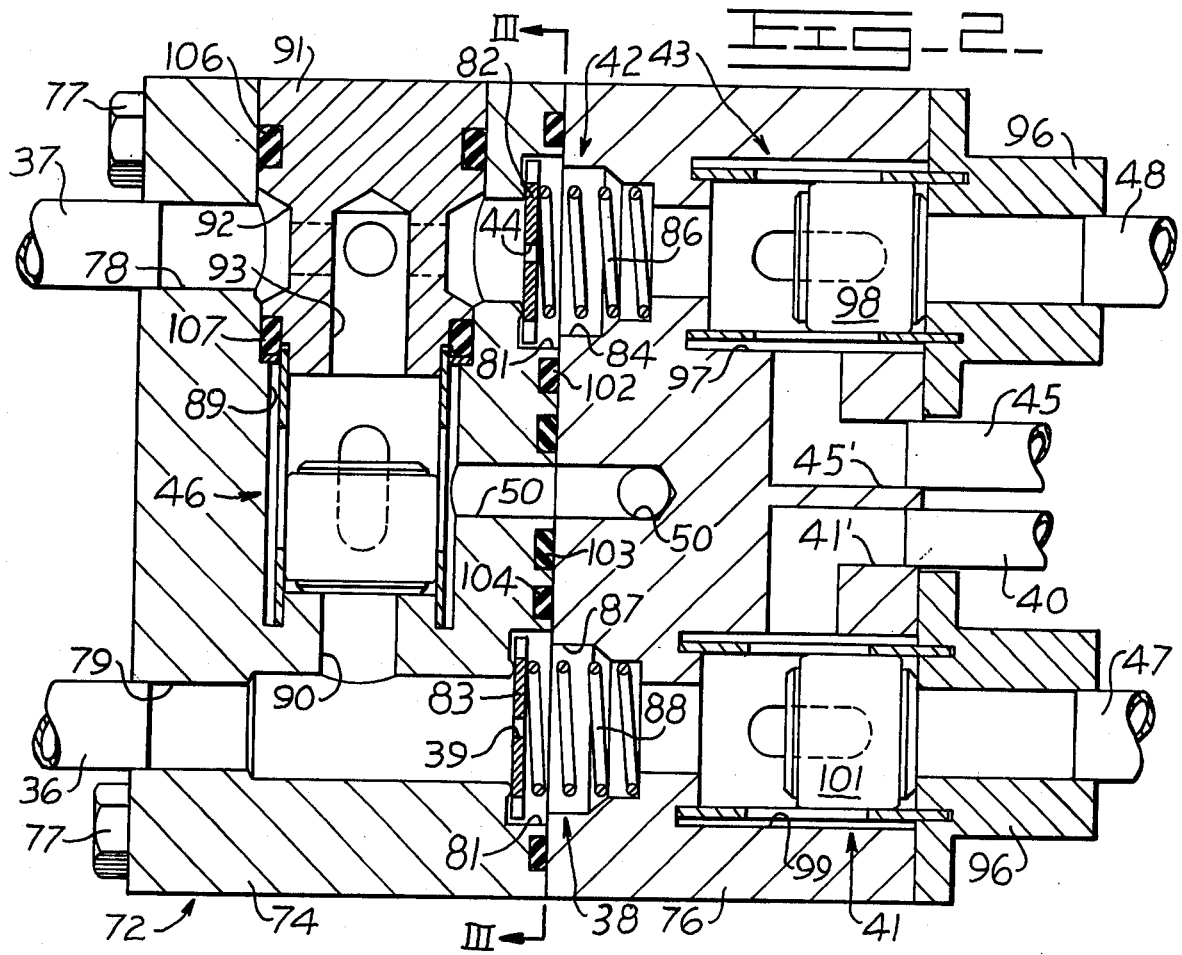

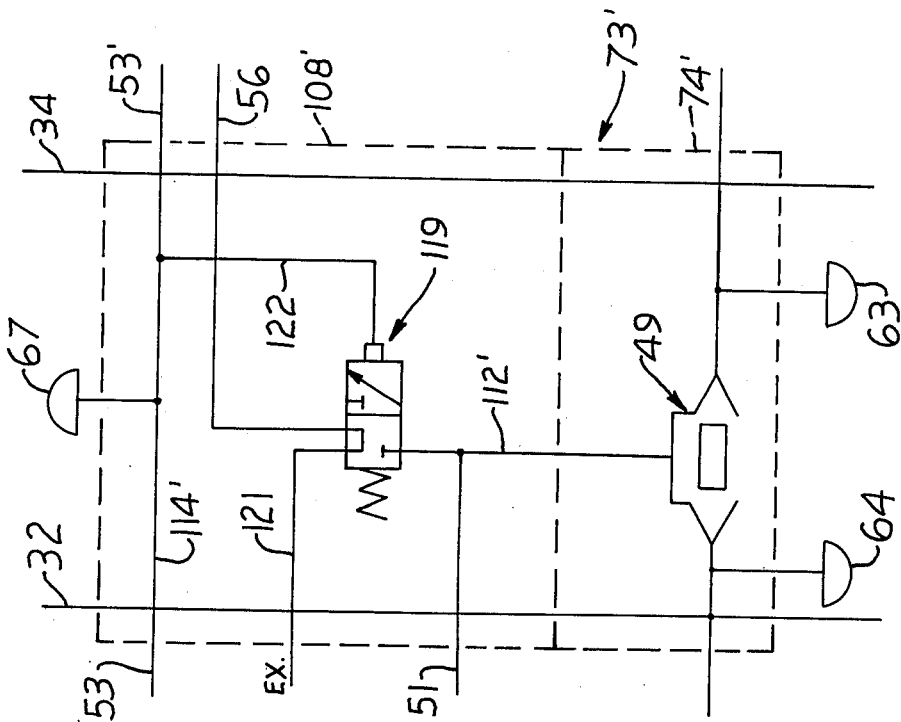
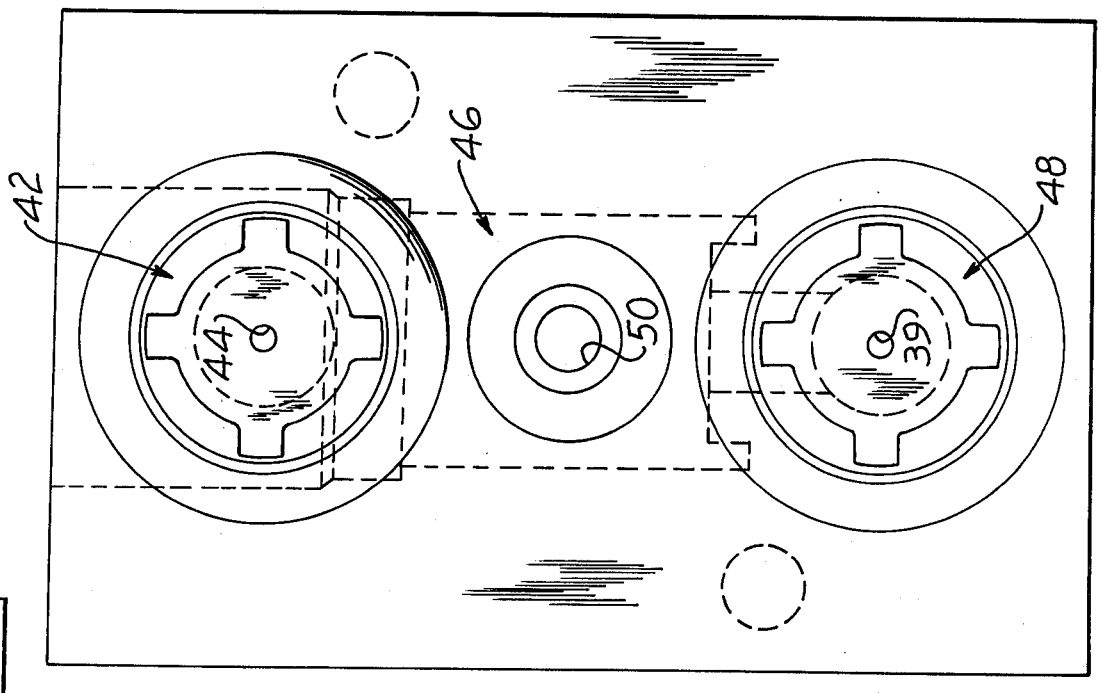

HIGH-RELIABILITY AIR BRAKE SYSTEM WITH TRANSMISSION NEUTRALIZER PROVIDING A PLURALITY OF OPERATIONAL MODES

BACKGROUND OF THE INVENTION

This invention relates to braking systems for vehicles and more particularly to air brake systems for vehicles which have a plurality of braking devices and a plurality of separate controls which the operator may manipulate to initiate any of a plurality of different forms of braking.

Many vehicles have a plurality of sets of brakes, partly to provide the safety of redundancy and in part to enable selection of any of a number of different modes of braking. A wheel loader vehicle, for example, of the type having an elevatable bucket for scooping up and lifting bulk materials typically has a set of front wheel brakes, a set of rear wheel brakes and a parking and emergency brake. Such vehicles are often equipped with a first brake pedal or the like which applies the front and rear wheel brakes for slowing and precisely controlling vehicle motion and may also have a second brake pedal which, in addition to applying the front and rear brakes, temporarily establishes a neutral condition in the vehicle transmission to facilitate bringing the vehicle to a full stop. Still another control activates the parking and emergency brake which in air-operated systems is usually spring-biased to the engaged position so that it goes on automatically if control system pressure should be lost.

It has heretofore been the practice to provide some degree of redundancy or duplication of pneumatic circuit elements which control the brakes so that if a pressure loss occurs in one side of the system, from rupture of a hose or fitting or other cause, at least some of the normal selective braking capacity is retained. In braking systems of the kind outlined above, this duplication has not been as complete as would be desirable.

Considering another factor very significant to the reliability of an air brake system, the possibility of malfunction from pressure loss is related to the number of fittings and connections between scattered circuit components that are required in the system. In certain prior forms of air brake system, a number of the circuit components have been situated within a single housing assembly which arrangement has the effect of reducing the number of fittings and connections in the circuit. These prior arrangements do not provide the control functions required in a multimode braking system of the particular kind described above and are not readily susceptible to modifications to accommodate to the needs of such a system.

SUMMARY OF THE INVENTION

This invention is an air brake control system having a simple and economical construction that provides for high reliability of braking functions in a vehicle having front brakes, rear brakes and control circuit arrangements. More particularly, the system is suited for a vehicle having a first brake control element for controllably applying the front and rear brakes through a first means, a second brake control element for also applying the front and rear brakes through a second means. Means is associated with air streams of only a selected one of the first and second means for providing a function absent in said 1st and second means.

The invention, together with further objects and advantages thereof will be better understood by reference to the following description of preferred embodiments taken in conjunction with the accompanying drawings.

BRIEF DESCRIPTION OF THE DRAWINGS

In the accompanying drawings:

FIG. 1 is a schematic diagram of a vehicle braking system embodying the invention, FIG. 2 is a section view of a first modular valve assembly which may be employed in the braking system of FIG. 1 to advantageously unitize several of the pneumatic elements of the circuit into a single assembly, FIG. 3 is a section view of the valve assembly of FIG. 2 taken along line III—III thereof, FIG. 5 is a schematic diagram of a modified form of the valve assembly of FIG. 4.

DETAILED DESCRIPTION OF THE INVENTION

Figure 4:
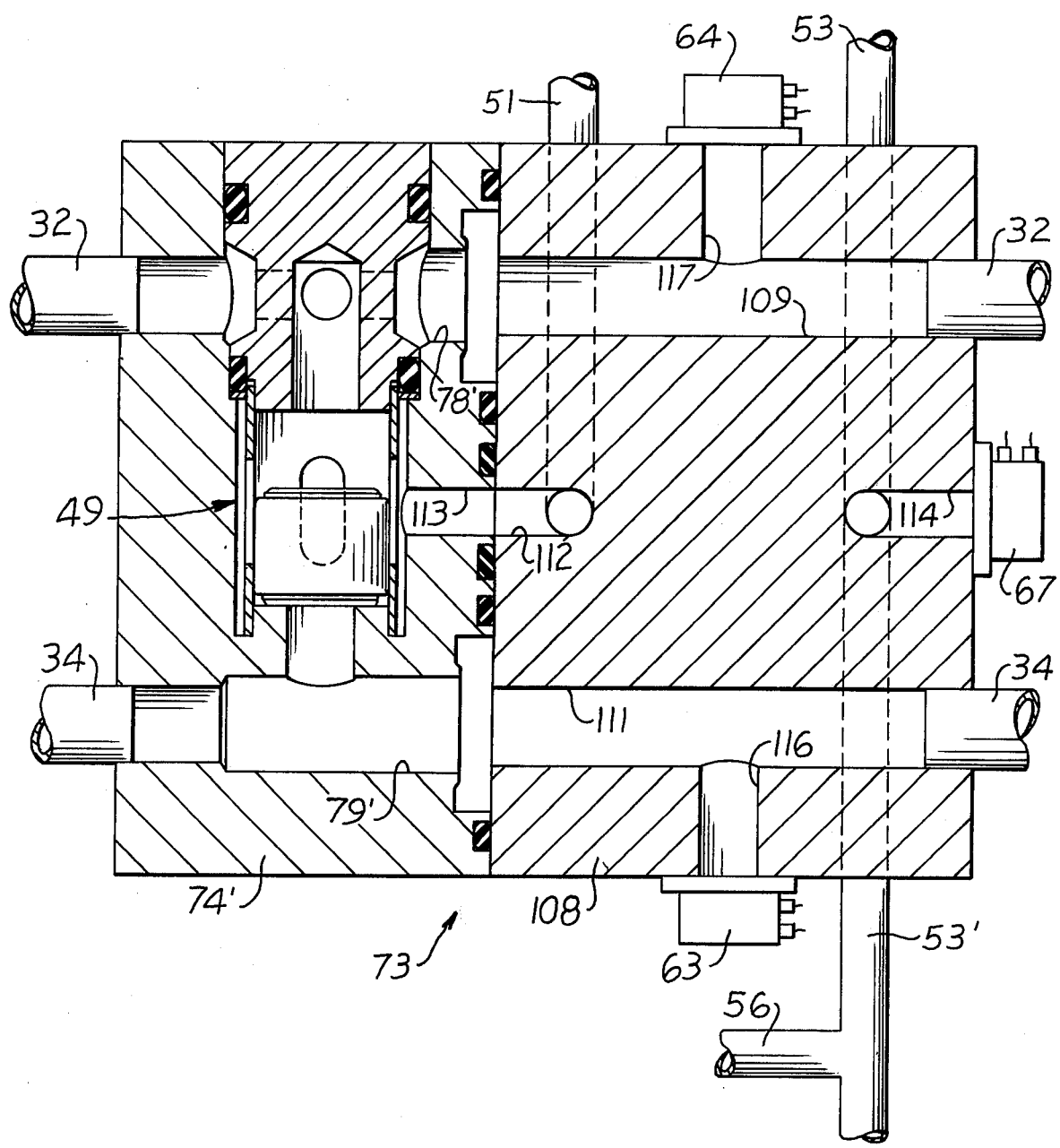
FIG. 4 is a section view of another modular valve assembly of the system of FIG. 1.

Referring initially to FIG. 1 of the drawings, an air brake system 11 is shown in schematic form together with certain components of a vehicle 12 with which the brake system most directly coacts. The brake system was designed for use on a wheel loader vehicle of the kind having an elevatable bucket for lifting earth or other bulk materials but it will be apparent that the invention is equally applicable to certain other forms of vehicle which have dual brake pedals or the like for initiating more than one mode of braking. As the vehicle 12 may itself be of known construction, only certain components of the vehicle are shown, in block form, in order to facilitate an understanding of the coaction of the present invention with other vehicle elements.

Vehicles of the type to which the invention is applicable are equipped with a set of front brakes 13 at the front wheels and a set of rear brakes 14 at the rear wheels and are usually additionally equipped with still another separate parking and emergency brake 16. The front and rear wheel brakes 13 and 14 are typically of the form which are self-biased to a disengaged position but which engage when air or other gas under pressure is applied to inlet ports 13' and 14' while emergency brake 16 is of the opposite form which is held engaged by internal spring means or the like except when air under pressure is applied to an inlet port 16'. Utilizing a parking and emergency brake of this spring-engaged kind adds to fail safety of the system since if air pressure should fail in the control system for any causes, then the vehicle is automatically braked by the resultant loss of air pressure at port 16'.

In order to prevent the vehicle engine 17 from working against the front and rear brakes 13 and 14 when the brakes are being applied, vehicles of the type to which the system is applicable often include a transmission neutralizer 18 which functions to temporarily place the vehicle transmission in neutral, regardless of the setting of the transmission shift control lever, when pressurized air is applied to an inlet port 18'. As will hereinafter be discussed in more detail, the transmission neutralizer 18 may be pressurized at the same time that the front and rear brakes 13 or 14 are pressurized and therefore acts to decouple the vehicle engine from the wheels during the period of braking.

For somewhat similar reasons, such vehicles may also be equipped with a transmission lockout device 19 which acts to urge the transmission shift lever to the neutral position except when an inlet port 19' is pressurized when the parking brake 16 is actuated, by means which will hereinafter be described, to inhibit inadvertent shifting of the vehicle into a drive setting of transmission while the parking brake is engaged.

Suitable detailed constructions for each of the above-described air pressure controlled vehicle components, specifically the front and rear brakes 13 and 14, parking and emergency brake 16, transmission neutralizer 18 and transmission lockout device 19, are known in the art and accordingly will not be further described.

Considering now the pneumatic circuit of the brake system 11, vehicles of the type to which the invention is applicable are customarily equipped with two separate brake pedals 21L and 21R or other equivalent control elements which may be separately manipulated by the vehicle operator to initiate a selected one of two different modes of braking operation. In particular, actuation of one control, such as the left pedal 21L, normally actuates both the front and rear brakes 13 and 14 simultaneously actuates the transmission neutralizer 18. This first mode of operation, initiated by operation of left pedal 21L in particular, is used when it is desired to bring the vehicle to a full stop or to effect a very large reduction of vehicle speed. Under those conditions it is not desirable that the engine be working against the brakes and actuation of the transmission neutralizer 18 keeps this from occurring.

The alternate mode of operation is initiated by actuating the other or right brake pedal 21R. In this alternate mode, the front and rear brakes 13 and 14 are actuated without neutralizing the transmission. This other mode of braking is used where it is desired to slow or retard motion of the vehicle a relatively small amount without bringing the vehicle to a full stop and without interrupting drive to the wheels.

Parking and emergency braking can be initiated by the operator by means of an independent control element, which is a translatable knob 22 in this example, that may be pulled to actuate the parking and emergency brake 16.

To provide pressurized air for actuating the brakes and other air-operated components described above, the vehicle is normally equipped with a compressor 23 driven by the vehicle engine 17.

Failure of the braking system can be a hazardous condition in a vehicle and for this reason it is known practice to build at least some degree of redundancy into a brake control system so that if a portion of the system should fail, other portions will continue to provide at least some braking capacity. The system depicted in FIG. 1 provides a very high degree of such redundancy extending from the outlet 23' of compressor 23 to the inlet lines of the front and rear brakes 13 and 14 with a minimum of structural complication.

Basically, the control system 11 provides two parallel circuits for actuation of both the front brakes 13 and rear brakes 14 upon operation of either of the pedals 21L and 21R and further provides for operation of at least one of the sets of brakes 13 and 14 if air lines or other pneumatic components associated with one such circuit should fail for any reason. This is additional to the fail safety provided by the parking and emergency brake 16 which, as previously pointed out, automatically engages if air pressure in the system should fail completely.

Division of the control system 11 into two portions, each capable of functioning independently of the other, begins at the compressor outlet conduit 24 which is branched to couple to separate portions of a partitioned reservoir 26. In effect the two reservoir portions constitute a pair of separate air pressure reservoir vessels 26A and 26B. Separate check valves 27A and 27B in the two branches of conduit 24 block release of air pressure back to the compressor in the event of compressor failure or when the engine 17 is shut down.

Depression of the left brake pedal 21L by the operator opens each of a pair of associated normally closed valves 28L and 29L. Similarly, depression of right brake pedal 21R opens each of another pair of normally closed valves 28R and 29R. Valves 28L and 28R share a single air inlet port 31 which is communicated with reservoir 26A through an air conduit 32 while valves 29L and 29R share another single inlet port 33 which is communicated with the other air reservoir 26B through a separate air conduit 34.

Upon depression of the left brake pedal 21L, air from inlet port 31 is transmitted to an outlet line 36 of valve 28L while air from port 33 is transmitted to a separate outlet line 37 of valve 29L.

Outlet line 36 supplies such air pressure to the rear brakes 14 through a one-way check valve 38, which is bypassed by a flow restriction 39, and a shuttle valve 41 of the form having two inlets and a single outlet and which functions as a resolver valve as will be hereinafter described. For this purpose, the outlet of one-way check valve 38 is connected to one of the two inlets of the shuttle valve 41 and the outlet line 40 of the shuttle valve is communicated with rear brake inlet port 14'.

Similarly, outlet line 37 responds to opening of valve 29L by supplying pressurized air to the inlet port 13' of the front brakes 13 through another one-way check valve 42 and another shuttle valve 43 arranged similarly to valves 38 and 41, the one-way check valve 42 again being bypassed by a flow restriction 44 and the outlet line 45 of shuttle valve 43 being connected inlet port 13' of the front brakes 13.

To actuate the transmission neutralizer 18 when brake pedal 21L is depressed, still another shuttle valve 46 has opposite inlets communicated with outlet lines 36 and 37 and has an outlet conduit 50 communicated with transmission neutralizer inlet port 18'. Accordingly, transmission neutralizer 18 is actuated if either or both of outlet lines 36 and 37 are pressurized.

Upon release of left brake pedal 21L, the front and rear brakes are vented, and therefore are disengaged, through shuttle valves 41 and 43, flow restrictions 39 and 44 and valves 28L and 29L. Transmission neutralizer 18 is exhausted through shuttle valve 46 and valves 28L and 29L. The flow restrictions 39 and 44 act to slow release of the brakes slightly to permit re-engagement of the transmission without abrupt shocks.

For the purposes previously point out, a different mode of braking operation is initiated when the operator depresses the right pedal 21R. In this different mode, the front brakes 13 and rear brakes 14 are again applied but the transmission neutralizer 18 is not actuated. For this purpose the outlet line 47 of valve 28R is communicated with the remaining inlet of shuttle valve 41 and the outlet line 48 of valve 29R is communicated with the remaining inlet of the other corresponding shuttle valve 43. Thus upon opening of valves 28R and 29R by operation of right pedal 21R, pressure is again delivered to the front and rear brakes. Upon release of the pedal 21R, the front and rear brakes are exhausted by the valves 28R and 29R. Thus the mechanisms described above provide for application of both the front and rear brakes in response to operation of either of the pedals 21.

Considering now means for controlling the parking and emergency brake 16, another shuttle valve 49 has one inlet coupled to air conduit 32 and the other inlet is coupled to air conduit 34 to receive pressurized air from either reservoir 26A or 26B. Shuttle valve 49 has an outlet line 51 connecting with an inlet of a parking and emergency brake control valve 52. Control valve 52, which may be shifted by the operator of the vehicle by means of the previously described knob 22, has an outlet line 53 communicated with the inlet port 16' of the parking and emergency brake. As previously pointed out, brake 16 is of the form which is spring-biased to an actuated position to provide fail safety and is only released when pressurized air is applied to inlet port 16'. Accordingly, at the off position of knob 22 control valve 52 transmits pressure from supply line 51 to outlet line 53 to release the parking and emergency brake. Upon shifting of the control valve 52 to the brake-on position, inlet port 16' is disconnected from supply line 51 and vented at valve 52 causing the parking and emergency brake to be actuated.

For the reasons previously discussed, inlet port 19' of the transmission lockout 19 should be depressureized to engage the lockout when inlet port 16' is depressurized to engage the parking and emergency brake 16. This may be accomplished by connecting transmission lockout inlet port 19' with line 53 through another line 56.

Certain other vehicle components may be readily coupled into the above-described system. For example, an air-operated horn 55 and actuator valve 57 may be connected into air conduit 32, for example, in proximity to one inlet of shuttle valve 49. Electrical components associated with the braking system may also be coupled into the system through pressure-actuated electrical switches. Such electrical components are typically operated from the vehicle battery 58 through the operator's engine on-off switch 59 in the case of a diesel-powered vehicle or through the ignition switch in the case of a gasoline-powered vehicle. An audible alarm 61 and preferably an indicator light 62 as well may be connected to switch 59 through both of two parallel connected normally closed electrical switches 63 and 64 of the form which open in response to fluid pressure of a predetermined magnitude. Switch 63 may be communicated with air conduit 34 while the other switch 64 is communicated with air conduit 32. Consequently, the alarm 61 and indicator light 62 are electrically actuated if system pressure drops below a predetermined operating level at either or both of reservoirs 26A and 26B or in the associated flow paths.

A parking brake "on" indicator lamp 66 may be controlled by an electrical connection to engine switch 59 through another normally closed pressure switch 67 having a pneumatic pilot connection to the line 53 which communicates the parking brake with the parking brake control valve 52 and which is held open by air pressure when it is present in line 53. The vehicle stop lights 68 may have parallel electrical connections to engine switch 59 through a pair of normally open switches 69 and 71 which close in response to air pressure. Switch 69 has a pneumatic pilot connection to the outlet of shuttle valve 43 while the pneumatic pilot connection of switch 71 is coupled to the outlet of shuttle valve 41. Thus, one or both of the switches 69 and 71 are pneumatically closed, to energize stop light 68, when either or both of the front brakes 13 and rear brakes 14 are actuated by air pressure from shuttle valves 43 and 41 respectively.

In operation, with air pressure reservoirs 26A and 26B pressurized and in the absence of system malfunction such as a ruptured air hose or the like, the vehicle operator may selectively initiate any of three modes of braking. First, by depressing right pedal 21R, motion of the vehicle may be retarded without interrupting drive from the engine to the wheels since pressure is then controllably transmitted to both the front brakes 13 and rear brakes 14 through the associated valves 28R, 29R and shuttle valves 43 and 41. In a wheel loader vehicle for example this mode of braking is often used when the bucket is being driven into the pile of material to be loaded and a precisely controlled slow motion of the vehicle is desired. If the vehicle is to be brought to a full stop, the operator normally utilizes the other brake pedal 21L as this not only actuates the front and rear brakes by transmitting pressure through check valve 42 and shuttle valve 43 to the front brakes and by transmitting pressure through check valve 38 and shuttle valve 41 to the rear brakes but also, through shuttle valve 46, transmits pressure to inlet port 18' to activate the transmission neutralizer and thereby temporarily decouple the engine from the wheel drive line. Third, when it is desired to park and immobilize the vehicle or for emergency braking purposes in the event of malfunction of the other braking systems, the operator may activate parking and emergency brake 16 by shifting control valve 22 which then exhausts line 53 activating the spring-engaged parking brake and exhausts line 56 activating the transmission lockout.

The foregoing description of the operation of the braking system is based on the assumption that there is adequate air pressure in both reservoirs 26A and 26B and that no significant system malfunction such as a ruptured air hose, malfunctioning check valve or the like is present. An important characteristic of the described system is a relatively high degree of fail safety in that at least some braking capacity is retained in the event of any of various such malfunctions. It may be observed that while operation of either pedal 21R or 21L normally activates both the front brakes 13 and rear brakes 14, there is also present, in effect, an alternate independent braking system for each such set of brakes which is automatically established in the event of loss of air in certain parts of the system. This division of the system into potentially independently operating systems for the front and rear brakes extends all the way back through the reservoir 26 to the outlet conduit 24 of the compressor.

Salient elements which constitute the potentially independent front brake actuating system include shuttle valve 43, check valve 42, right and left pedal-operated valves 29R and 29L, air conduit 34 and reservoir 26B. Corresponding elements of the potentially independent rear brake system include shuttle valve 41, check valve 38, right and left pedal-operated valves 28R and 28L, air conduit 32 and reservoir 26A. If a pressure loss should occur, from hose rupture or excessive leakage, at any point in the system from the front and rear brakes back through reservoirs 26, then operation of either brake pedal 21R, 21L will continue to actuate at least one set of brakes, the particular set which remains actuatable being dependent on which portion of the system has malfunctioned. In the presence of such a malfunction, the shuttle valves 41, 43, 46 and 49 act to seal off the malfunctioning side of the system from the operative one. A loss of all braking capacity which is normally available through operation of the foot pedals 21R and 21L would only occur if both sides of the system malfunctioned simultaneously but this does not mean that the operator would no longer have any elective braking capacity. As long as pressure remains available at either side of the system, emergency braking may be deliberately initiated by operating valve 52. If there is a total loss of system pressure, the parking and emergency brake 16 is automatically actuated as previously described.

Most of the components of the above-described pneumatic circuit including the valves, flow junctions and the like may readily be contained in one or two unitized modular circuit component assemblies to realize the several advantages hereinbefore discussed. As previously pointed out, such a construction increases system reliability by reducing the number of independent fittings and connections which may be required, by over 50% in this example, inasmuch as such fittings and connections are each a potential source of leakage. Modular unitization also improves serviceability by enabling location of at least a majority of the valves, pressure switches and the like in one or two convenient accessible locations on the vehicle. Cost of construction of the system as a whole is also reduced by this means. Functionally distinct portions of the system can, for example, be built up from structurally similar modules in some cases.

In the present example, shuttle valves 41, 43, 46, check valves 38 and 42 and flow restrictions 39 and 44, including the air flow path junctions between such elements are all unitized into a single modular assembly 72. Associated pressure controlled electrical switches, such as pressure switches 69 and 71, are also readily mounted on such a modular assembly 72. In this example, the shuttle valve 49 and associated flow junctions are also contained within another unitized modular component assembly 73 on which the other pressure switches 63 and 64 and 67 may be mounted. Although the second modular assembly 73 contains only a single shuttle valve 49 in this example, the construction enables additional optional components to be more readily coupled into the system, an example of which will hereinafter be described.

Considering now a suitable physical structure for the first modular assembly 72, reference should be made to FIGS. 2 and 3 in combination. Assembly 72 in this instance is comprised of two rectangular block module bodies 74 and 76 secured together by suitable fasteners such as bolts 77. Module 74 has spaced-apart parallel flow passages 78 and 79 to which the outline lines 37 and 36 respectively from the left brake pedal control valves are connected. Both such passages 78 and 79 extend towards the surface of module 74 which is adjacent module 76 and both such passages have enlargements 81 as such surface is approached. To constitute check valve 42, a disc 82 is disposed in the enlarged portion 81 of bore 78 and to constitute check valve 38 a similar disc 83 is disposed in the enlarged portion 81 of bore 79. Flow restrictions 44 and 39 are defined by small central apertures in the discs 82 and 83 respectively. The other module 76 has a first stepped flow passage 84 adjacent to and continuous with the first passage enlargement 81 of the first module 74 and in which a compression spring 86 is disposed to extend between the two modules to bear against disc 82 and thereby complete the check valve 42. Similarly, a second parallel stepped passage 87 in second module 76 is aligned with the other enlarged passage portion 81 of the first module 74 and contains a compression spring 88 which bears against disc 83 to constitute part of the check valve 48.

To form the neutralizer shuttle valve 46, a relatively large bore 89 extends in from one end of first module body 74, intersecting flow passage 78 and has a reduced diameter end portion 90 communicated with flow passage 79. The outer portion of bore 89 including that portion which intersects flow passage 78 is plugged by a cylindrical member 91. Member 91 has an annular groove 92 which provides for flow passage continuity from line 37 to check valve 82 and the groove is also communicated with the center of the innermost end of plug member 91 by a passage 93 in the member 91. The outlet line 50 of neutralizer shuttle valve 46 communicates with bore 89 at a point equidistant from the adjacent ends of passages 90 and 93 and extends into the second module body 68 for connection to the transmission neutralizer inlet port as previously described.

Outlet lines 47 and 48 from the right brake pedal-operated valve and shuttle valve outlet lines 40 and 45 to the rear and front brakes respectively each connect to the surface of second module body 76 which is opposite from the first module body 74, and end member 96 being secured against module 76 by bolts 77 to receive the lines 48 and 47 in particular. End member 96 defines one end of a cylindrical bore 97 within the second module which is communicated with flow passage 84 at one end and with line 48 at the other end, the mid-region of bore 97 being communicated with line 45 to the inlet port of the front brakes by a passage 45'. Bore 97, together with a cylindrical valve element 98 which is slidable in an axial direction therein in response to air pressures, constitutes the front brake shuttle valve 43.

Similarly end member 96 defines one end of another cylindrical bore 99 in second module body 76 with bore 99 being communicated at one end with the outlet line 47 of the right brake pedal-controlled valve 28R and with the other end of bore 99 being communicated with flow passage 87 of the second module. Line 40 to the inlet port of the rear brakes is communicated with the mid-region of bore 99 by a passage 41'. To complete the rear brake shutte valve 41, a cylindrical valve element 101 is disposed in bore 99 for axial movement therein in response to air pressures.

To inhibit leakage, resilient annular sealing elements 102, 103 and 104 may be compressed between the two modules 74 and 76 in encircling relationship to one bore enlargement 81, flow conduit 50 and the other bore enlargement 81 respectively. For similar reasons annular sealing elements 106 and 107 may be encircled around plug member 91 of the first module at opposite sides of groove 92.

Considering now an advantageous aspect of the above-described modular assembly 72, additional ones of the component modules may be utilized to define other functionally different portions of the circuit without significant modifications. Referring temporarily again to FIG. 1, it has been pointed out that this example of the invention utilizes a separate modular assembly 73 in addition to the one described above. However, this second modular assembly may in fact include a first module 74' which is structurally identical to the first module 74 of the modular assembly 72. A suitable physical structure for the second modular asembly 73 on this basis is depicted in FIG. 4.

As may be seen in FIG. 4, a third module 74' is identical in all structural respects with the first module 74 of the other modular assembly 72 although in this case, it is air lines 32 and 34 which connect to the third module 74' and the internal shuttle valve of the third module constitutes transmission lockout shuttle valve 49 of the system shown schematically in FIG. 1. The other module of modular assembly 73, that is the fourth module, may be a rectangular block 108 secured against module 74' opposite from the side to which air lines 32 and 34 connect. The fourth module body 108 contains parallel spaced-apart flow passages 109 and 111 which extend from the connecting lines 32 and 34 respectively to the flow passages 78' and 79' respectively of the module 74'. The several flow lines 51, 53, 53' and 56 of the system as described with reference to FIG. 1 also connect to fourth module body 108. Referring again to FIG. 4, within module body 108, a passage 112 connects line 51 with the outlet passage 113 from shuttle valve 49 of the other module body 74' and another branched passage 114 in the module body 108 communicates line 53 with pressure switch 67 and both of lines 53' and 56.

The modular construction readily lends itself to a convenient mounting of the previously described pressure-operated electrical switches on the modular assemblies. Thus the switches 63 and 64, which are electrically connected in parallel to operate an audible alarm and low air pressure warning lamp as previously described, may be mounted on opposite surfaces of module body 108 at openings 116 and 117 respectively which communicate with internal flow passages 111 and 109 respectively.

Still another advantage of the modular construction is that it greatly facilitates the adding in of optional additional braking system components where these might be desired. Referring momentarily again to FIG. 1 it may be seen that release of air from the transmission lockout 19 to actuate the transmission lockout occurs through the lines 56 and 53 leading to the operator's parking and emergency brake control valve 52. The arrangement shown is a preferred one in most instances but if, due to the configuration of a particular vehicle, these lines 56 and 53 are necessarily very long, then release of the transmission lockout in response to opening of valve 52 may be undesirably slow. In that event one of the above-described modules may be modified to include a relay valve which provides a shorter exhaust path for the transmission lockout. In particular and with reference to FIG. 5, there is shown a modified form of the modular assembly 73 which provides such means.

In the modified form 73' of FIG. 5, the third module 74' containing the transmission lockout shuttle valve 49 remains unchanged and accordingly will not be further described. The desired additional function is accomplished by simply replacing the original additional module of the assembly with a modified fourth module 108'. As in the previous instance, fourth module 108' connects the output passage 112' from parking and emergency brake shuttle valve 49 with the air conduit 51 and also provides a flow passage 114' connecting line 53 from the parking and emergency brake control valve to line 53' which connects with the parking and emergency brake itself. The line 56 to the transmission lockout also connects with module boyd 108' as in the previous instance but in this case is not internally connected within module to line 114'. Instead, a relay valve 119 may be contained within module body 108' forthe purpose of directly coupling the transmission lockout control line 56 to the outlet passage 112' of shuttle valve 49 in response to fluid pilot pressure in passage 114', which pilot pressure indicates that the parking and emergency brake is off.

For this purpose relay valve 119 may be of the two-position pilot-operated form which is spring-biased towards a first position at which transmission lockout line 56 is connected to a vent or exhaust passage 121 by the relay valve. The pilot of relay valve 119 is connected to passage 114' by a pilot signal passage 122. When the passage 114' is pressurized, indicating that the parking and emergency brake is off, valve 119 is thereby piloted to the alternate position at which line 56 to the transmission lockout is disconnected from exhaust line 121 and receives pressure directly from outlet 112' of shuttle valve 49.

It will be apparent that the arrangement of FIG. 5 is but one example of how supplementary or additional optional control system modifications may readily be provided by substituting in appropriately modified individual modules.

While the invention has been disclosed with respect to certain preferred embodiments, it will be apparent that many modifications are possible and it is not intended to limit the invention except as defined in the following claims.

What is claimed is:

1. An air brake control system for a vehicle having an air compressor, front and rear brakes, and first and second brake control elements, comprising:
    first and second air reservoirs each connected to the compressor;
    first means responsive to the first brake control element for controllably communicating an air stream from one of the air reservoirs with the front brake while communicating the rear brake with an air stream from the other of said reservoirs;
    second means responsive to the second brake control element for controllably communicating an air stream from one of the air reservoirs with the front brake while communicating the rear brake with an air stream from the other of said reservoirs; and
    third means associated with air streams of only a selected one of the first and second means for providing a function absent in said first and second means, said
    third means comprising a transmission neutralizer.

2. A control system, as set forth in claim 1, wherein the vehicle has a parking and emergency brake and including:
    a parking and emergency brake shuttle valve having first and second inlets and an outlet, said inlets each communicating with a separate one of said reservoirs;
    a third brake control element; and
    a third brake actuating valve means responsive to said third brake control element for controllably pressurizing and venting said parking and emergency brake, said third brake actuating valve means being connected between said parking and emergency brake and said outlet of said parking and emergency brake shuttle valve.

3. A control system, as set forth in claim 2, wherein said control system is of a construction sufficient for actuating one of the brakes and the third means in the absence of an air stream between one of the air reservoirs and the other brake.

4. A control system, as set forth in claim 3, including:
a pair of one-way flow valves, each connected to and between said compressor and a separate one of said reservoirs; and
wherein said first means comprises:
a front brake shuttle valve having first and second inlets and an outlet, said outlet being connected to said front wheel brakes;
first brake actuating valve means responsive to said first brake control element for controllably communicating the first inlet of said front brake shuttle valve with said first reservoir while separately communicating the first inlet of said rear brake shuttle valve with said second reservoir; and
said second means comprises:
a rear brake shuttle valve having first and second inlets and an outlet, said outlet being connected to said rear wheel brakes; and
second brake actuating valve means responsive to said second brake control element for controllably communicating the second inlet of said front brake shuttle valve with said first reservoir while separately communicating the second inlet of said rear brake shuttle valve with said second reservoir.

5. A control system, as set forth in claim 4 wherein the vehicle has a transmission and the third means establishes a neutral condition in said transmission in response to air pressure.

6. A control system, as set forth in claim 5, wherein the third means includes
first and second outlet lines communicating said second brake actuating valve means with the second inlets of said front and rear brake shuttle valves; and
a neutralizer shuttle valve having an outlet and first and second inlets, said outlet communicating with said transmission neutralizer and said first and second inlets each communicating with a respective one of said pair of outlet lines.

7. A control system, as set forth in claim 5, including:
lockout means for inhibiting changing the transmission neutralizer from a neutral position except in response to air pressure being supplied to said lockout means.

8. A control system, as set forth in claim 7, wherein the lockout means comprises:
a locking element;
a lockout shuttle valve having an outlet and first and second inlets, said outlet communicating with said locking element and said first and second inlets each communicating with a respective one of said reservoirs.

9. A control system, as set forth in claim 6, including:
lockout means for inhibiting changing the transmission from the neutral position except when air pressure is supplied to said lockout means.

10. A control system, as set forth in claim 9, wherein the lockout means comprises:
a locking element;
a lockout shuttle valve having an outlet and first and second inlets, said outlet communicating with said locking element and said first and second inlets each communicating with a respective one of said reservoirs.

11. A control system, as set forth in claim 10, wherein said neutralizer shuttle valve, said lockout shuttle valve, said front brake shuttle valve, and said rear brake shuttle valve are each of like construction, and each from a separate module juxtapositionable with an associated module.

12. A control system, as set forth in claim 10, wherein the neutralizer shuttle valve and the lockout shuttle valve are of like construction.

13. A control system, as set forth in claim 10, including:
a third one-way flow valve connected to and between the first inlet of said neutralizer shuttle valve and the second inlet of said front brake shuttle valve; and
a fourth one-way flow valve connected to and between the second inlet of said neutralizer shuttle valve and the second inlet of said rear brake shuttle valve.

14. A control system, as set forth in claim 13, including:
a pair of flow restrictions each connected in parallel with a separate one of said third and fourth one-way flow valves.

15. A control system, as set forth in claim 10, wherein said front brake shuttle valve, said rear brake shuttle valve, said neutralizer shuttle valve, said third and fourth one-way flow valves, and said pair of restrictors are all centered within a first single unitized circuit component assembly.

16. A control system, as set forth in claim 15, wherein said first unitized circuit component assembly is comprised of at least a first and a second module which are juxtaposed and wherein the first module contains said front brake shuttle valve and said rear brake shuttle valve, and the second module contains said neutralizer shuttle valve and said pair of flow restrictions and at least portions of said third and fourth one-way flow valves.

17. A control system, as set forth in claim 16, wherein the juxtaposed surfaces of said first and second modules each have juxtaposed flow passages for communicating the third one-way flow valves with the second inlet of said front brake shuttle valve and for communicating the fourth one-way flow valves with the second inlet of said rear brake shuttle valve.

18. A control system, as set forth in claim 16, including:
a parking and emergency brake;
a parking and emergency brake control means including a third brake actuating valve means;
a third module containing the lockout shuttle valve; and
a fourth module juxtaposed against said third module and containing a first flow passage for communicating said outlet of said lockout valve with said third brake actuating valve means.

19. A control system, as set forth in claim 18, wherein said second and third modules are of similar construction.

20. A control system, as set forth in claim 18 wherein said fourth module has a second flow passage communicating said third brake actuating valve means with said parking and emergency brake and has a third flow passage communicated with said lockout means, and contains a relay valve normally biased toward a position at which said relay valve vents said third flow passage, said fourth module further containing valve piloting means responsive to pressure in said second passage by shifting said relay valve to another position at which said third passage is communicated with said first passage.

* * * * *